United States Patent
Hong et al.

(10) Patent No.: US 11,070,794 B2
(45) Date of Patent: Jul. 20, 2021

(54) VIDEO QUALITY ASSESSMENT METHOD AND APPARATUS

(71) Applicant: Huawei Technologies Co., Ltd., Shenzhen (CN)

(72) Inventors: Hanshu Hong, Nanjing (CN); Feng Dong, Nanjing (CN); Wei Song, Nanjing (CN); Qingping Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/689,742

(22) Filed: Nov. 20, 2019

(65) Prior Publication Data

US 2020/0162725 A1   May 21, 2020

(30) Foreign Application Priority Data

Nov. 21, 2018   (CN) .......................... 201811394012.1

(51) Int. Cl.
*H04N 17/04*   (2006.01)
*G06N 20/00*   (2019.01)
(Continued)

(52) U.S. Cl.
CPC ............. *H04N 17/04* (2013.01); *G06N 5/003* (2013.01); *G06N 20/00* (2019.01);
(Continued)

(58) Field of Classification Search
CPC ................... H04N 21/44008; H04N 21/44209
(Continued)

(56) References Cited

U.S. PATENT DOCUMENTS 9,143,776 B2 *   9/2015  Zhang ................... H04N 17/02
2009/0281981 A1   11/2009  Chen et al.
(Continued)

FOREIGN PATENT DOCUMENTS

| CN | 102457390 A | 5/2012 | |
|---|---|---|---|
| CN | 102802089 A | 11/2012 | |
| WO | WO-2018114519 A1 * | 6/2018 | ......... H04L 43/0829 |

OTHER PUBLICATIONS

Chen, H., et al., "End-to-end Quality Adaptation Scheme Based on QoE Prediction for Video Streaming Service in LTE Networks," XP032473484, First International Workshop on Modeling, Measurements and Optimization of Video Performance Over Wireless Networks, May 17, 2013, 7 pages.
(Continued)

*Primary Examiner* — Nasser M Goodarzi
*Assistant Examiner* — Jaycee Imperial
(74) *Attorney, Agent, or Firm* — Conley Rose, P.C.

(57) ABSTRACT

In a video quality assessment method, an assessment model is first generated based on a subjective assessment result of a user on each sample in a sample set and based on a parameter set (a parameter type in the parameter set may include at least one of a packet loss rate, a delay, and a jitter) of each sample. Therefore, when video quality is being assessed, a parameter set of a to-be-assessed video is obtained first, where the parameter set of the to-be-assessed video has a same parameter type as the parameter set of each sample that is used to generate the assessment model; and then video quality of the to-be-assessed video is assessed based on the assessment model and the parameter set of the to-be-assessed video, to obtain an assessment result.

20 Claims, 6 Drawing Sheets

(51) Int. Cl.
*G06N 5/00* (2006.01)
*H04N 21/44* (2011.01)
*H04N 21/442* (2011.01)
*H04N 21/466* (2011.01)

(52) U.S. Cl.
CPC . *H04N 21/44008* (2013.01); *H04N 21/44209* (2013.01); *H04N 21/4665* (2013.01)

(58) Field of Classification Search
USPC .......................................................... 725/107
See application file for complete search history.

(56) References Cited

U.S. PATENT DOCUMENTS

| | | | |
|---|---|---|---|
| 2011/0211629 A1* | 9/2011 | Gustafsson | H04N 19/46 375/224 |
| 2015/0341667 A1* | 11/2015 | Liao | H04L 65/4076 375/240.27 |
| 2019/0364311 A1* | 11/2019 | Nilsson | H04N 21/6583 |

OTHER PUBLICATIONS

Li, F., et al., "A QoS Guaranteed Technique for Cloud Applications Based on Software Defined Networking," XP011672176, Aug. 23, 2017, accepted Sep. 12, 2017, date of publication Sep. 22, 2017, 13 pages.

Liu, Y., et al., "Can HTTP/2 Really Help Web Performance on Smartphones?," XP032953790, IEEE International Conference on Services Computing, 2016, pp. 219-226.

Vouzis, P., "Impact of Packet Loss, Jitter, and Latency on VoIP," NETBEEZ, Aug. 18, 2016, 10 pages.

Dan, Y., "End-To-End Quality of User Experiment for Streaming Video Services Over Mobile Network," Published date Aug. 15, 2015, 80 pages.

Xu, X., et al., "Data Mining Principle and Business Application," Mar. 2013, 18 pages.

* cited by examiner

VIDEO QUALITY ASSESSMENT METHOD AND APPARATUS

CROSS-REFERENCE TO RELATED APPLICATIONS

This application claims priority to Chinese Patent App. No. 201811394012.1 filed on Nov. 21, 2018, which is incorporated by reference.

TECHNICAL FIELD

This application relates to the field of video processing technologies, and in particular, to a video quality assessment method and apparatus.

BACKGROUND

With development of communications technologies, a demand for video services rapidly increases, causing a relatively heavy burden to a network. Because of a limited network resource, to ensure service quality of the video service, video quality that can be provided by the network may be obtained by using a video quality assessment technology, and an encoding parameter, a transport channel parameter, and the like of a video are adjusted based on the video quality, thereby improving the service quality of the video service when a relatively large demand is met.

Currently, when the video quality is being assessed, an objective assessment technology is mainly used, for example, obtaining objective indicators such as a packet loss rate, a delay, and a jitter of a video to assess the video quality. However, when a network parameter remains the same, a same video may present different quality due to different performance, such as de jitter and packet loss concealment, of different applications. For example, a packet loss rate 3% is generated in a process of transmitting a video in a network. However, an application A is unaffected by the packet loss rate, that is, when the video is played in the application A, image quality of the video is very clear, and video stalling does not occur. In comparison, an application B may be affected greatly by the packet loss rate, that is, when the video is played in the application B, image quality of the video is unclear, and video stalling occurs frequently. It can be learned that the objective assessment technology is not universally applicable to a plurality of different applications.

SUMMARY

This application provides a video quality assessment method and apparatus, to improve universality of a video quality assessment technology.

According to a first aspect, a video quality assessment method is provided. In the method, an assessment model is first generated based on a subjective assessment result of a user on each sample in a sample set and based on a parameter set (a parameter type in the parameter set may include at least one of a packet loss rate, a delay, and a jitter) of each sample. Therefore, when video quality is being assessed, a parameter set of a to-be-assessed video is obtained first, where the parameter set of the to-be-assessed video has a same parameter type as the parameter set of each sample that is used to generate the assessment model; and then video quality of the to-be-assessed video is assessed based on the assessment model and the parameter set of the to-be-assessed video, to obtain an assessment result.

In the foregoing technical solution, the subjective assessment result used to generate the assessment model may reflect different quality presented by a same sample in different applications. To be specific, when the assessment model is being generated, objective indicators of all samples and effects, brought by different applications, on video quality of each sample are considered, so that a method for assessing the video quality of the to-be-assessed video by using the assessment model is applicable to different applications. In addition, because the method for assessing the video quality of the to-be-assessed video by using the assessment model is applicable to different applications, relatively accurate assessment results can be obtained when the video quality is assessed in different applications, and accuracy of the video quality assessment method can be improved.

In a possible design, before the assessment model is obtained, N test videos are first obtained, where N is an integer greater than or equal to 2. Then, a parameter set of each test video and a subjective assessment result of the user on the test video are obtained, so as to obtain a sample corresponding to each test video, to obtain N samples. Finally, the N samples are classified based on different parameter types in the parameter set to obtain a decision tree model, and the decision tree model is the assessment model.

In the foregoing technical solution, the N samples may be first obtained, and then the assessment model is obtained by training the N samples, so that accuracy of the assessment model can be ensured.

In a possible design, the test video is obtained by adding an impairment corresponding to each parameter type to a source video. The impairment is represented by a parameter value, and parameter values corresponding to all the parameter types form the parameter set corresponding to the test video.

In the foregoing technical solution, test videos in different network parameter (such as a delay, a packet loss, and a jitter) environments may be obtained by simulating network impairments. An implementation is simple.

In a possible design, a sample corresponding to the test video is obtained by establishing a mapping relationship between at least one parameter of a delay value, a packet loss rate value, and a jitter value of the test video and the subjective assessment result of the user on the test video. The delay value of the test video is determined based on a sending time of sending a data packet of the test video by a transmit end and a receiving time of receiving the data packet by a receive end. The packet loss rate value of the test video is determined based on a first quantity of data packets of the test video that are sent by the transmit end in a unit time and a second quantity of data packets of the test video that are received by the receive end in the unit time, and the packet loss rate value of the test video is a ratio of the second quantity to the first quantity. The jitter value of the test video is determined based on a time interval between a sending time of each of a plurality of data packets of the test video that are received in a unit time and a receiving time of each data packet received by the receive end in the unit time.

In the foregoing technical solution, the test samples used to generate the assessment model include objective indicators of the samples and assessment results of the user on different samples. Therefore, a video quality assessment manner combining a subjective assessment manner with an objective assessment manner is provided, so that accuracy of the video quality assessment method can be improved.

In a possible design, when the decision tree model is obtained, the N samples may be first classified into a test set and a plurality of training sets, and then samples in each of the plurality of training sets are classified based on the different parameter types in the parameter set, to generate an initial decision tree model corresponding to each training set. Then, at least one sample in the test set is used to test a plurality of initial decision tree models, to obtain a group of test results corresponding to each initial decision tree model. Finally, a group of test results that are the same as subjective assessment results of all samples are determined in a plurality of groups of obtained test results. An initial decision tree model corresponding to the group of test results is the assessment model for video quality assessment.

In the foregoing technical solution, by obtaining the plurality of initial decision tree models and testing the plurality of initial decision tree models by using samples in the test set, the most accurate decision tree model may be obtained from the plurality of initial decision tree models and used as the assessment model for video quality assessment, so that the accuracy of the video quality assessment method can be improved.

In a possible design, the initial decision tree model corresponding to each training set may be obtained in the following manner:

First, an information gain of each parameter type in M samples included in the training set is calculated. The information gain of each parameter type in the M samples is a difference between first information entropy and second information entropy. The first information entropy is information entropy obtained based on a value of a subjective assessment result of each sample in the M samples used as a whole. The second information entropy is a sum of first sub information entropy and second sub information entropy. The first sub information entropy is information entropy obtained based on values of subjective assessment results of L samples, the second sub information entropy is information entropy obtained based on values of subjective assessment results of P samples, the L samples and the P samples are obtained by dividing the M samples based on a division condition that a value of the parameter type is greater than or equal to a preset parameter value, M=L+P, and M, L, and P are positive integers. Then, in information gains corresponding to all parameter types, a first parameter type corresponding to a maximum value of the information gains is determined as a root node. The M samples are divided into two level-1 subsets based on a division condition that a value of the root node is greater than or equal to a value of the first parameter type. The value of the first parameter type is a parameter value corresponding to a maximum value of information gains of the first parameter type in the M samples. In a same manner as the foregoing steps (to be specific, a manner based on information gains of each parameter type in the two level-1 subsets), a second parameter type corresponding to a maximum value of a plurality of information gains corresponding to each level-1 subset is determined as a subnode of the level-1 subset. At least two samples in the level-1 subset are divided into two level-2 subsets based on a division condition that a value of the subnode is greater than or equal to a value of the second parameter type. The value of the second parameter type is a parameter value corresponding to a maximum value of information gains of the second parameter type in the level-1 subset. The initial decision tree model corresponding to the training set is obtained when it is determined that at least two subjective assessment results of at least two samples included in any one of the two level-2 subsets are the same or any one of the two level-2 subsets includes only one sample.

In the foregoing technical solution, the assessment model for video quality assessment is obtained by using a machine learning method, and this can improve accuracy of the assessment model. In addition, the assessment model is obtained based on an assessment result and an objective indicator (a plurality of parameters in a parameter set), so that the assessment model is applicable to different applications, and an application scope of the assessment model can be improved.

According to a second aspect, an apparatus is provided. The apparatus has a function of implementing the video quality assessment method in any one of the first aspect or the possible implementations of the first aspect. The function may be implemented by hardware or may be implemented by hardware executing corresponding software. The hardware or the software includes one or more modules corresponding to the foregoing function.

In a possible design, a structure of the apparatus includes a communications unit and a processing unit. These units may perform corresponding functions in any one of the first aspect or the possible implementations of the first aspect. For details, refer to the detailed descriptions in the method examples. Details are not described herein again.

In a possible design, the structure of the apparatus includes a communications interface, a processor, and a memory. The communications interface is configured to receive and send data, and the processor is configured to support the apparatus in performing the corresponding functions in any one of the first aspect or the possible implementations of the first aspect. The memory is coupled to the processor, and the memory stores a program instruction and data for the apparatus.

According to a third aspect, a computer readable storage medium is provided. The computer readable storage medium stores an instruction. When the instruction runs on a computer, the computer is enabled to perform the method in any one of the first aspect or the possible implementations of the first aspect.

According to a fourth aspect, a computer program product including an instruction is provided. When the instruction runs on a computer, the computer is enabled to perform the method in any one of the first aspect or the possible implementations of the first aspect.

For benefits of the second aspect to the fourth aspect and the implementations of the second aspect to the fourth aspect, refer to descriptions of benefits of the method in the first aspect and the implementations of the first aspect.

DESCRIPTION OF EMBODIMENTS

Figure 1:
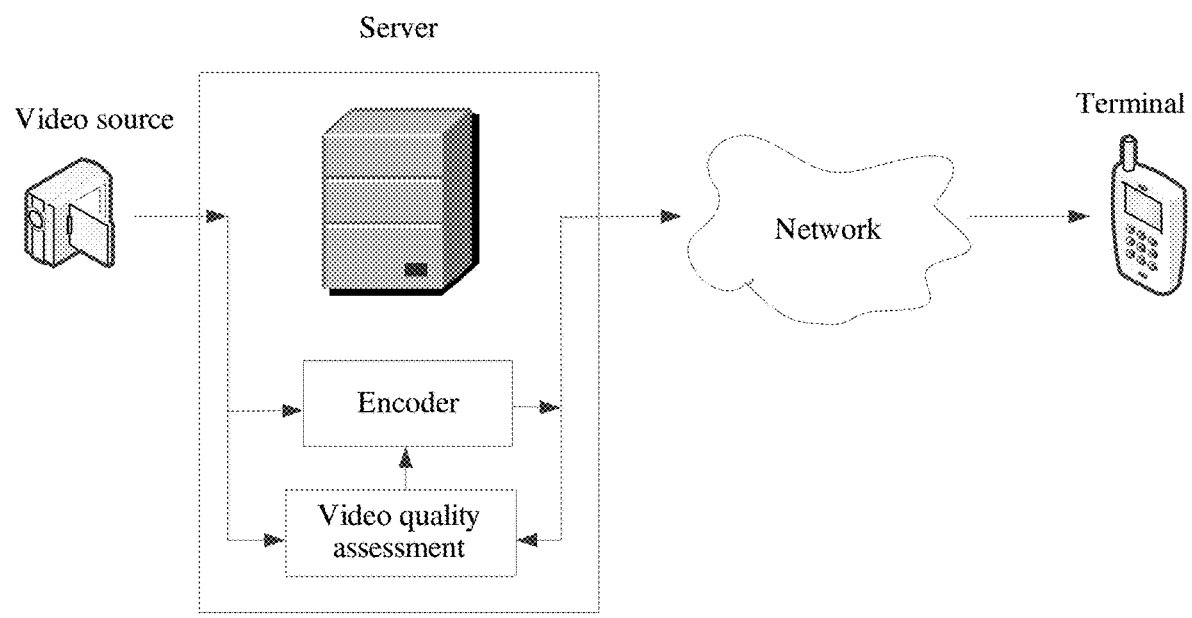
FIG. 1 is a schematic diagram of an example of a scenario in which video quality is assessed according to an embodiment of this application.

In the descriptions of this application, "a plurality of" means two or more, or may be understood as "at least two". "At least one" may be understood as one or more, such as one, two, or more. "Including at least one" means including one, two, or more, and which ones are included is not limited. For example, including at least one of A, B, and C may mean including A, B, C, A and B, A and C, B and C, or A and B and C. "And/or" describes an association relationship between associated objects and represents that three relationships may exist. For example, "A and/or B" may represent the following three cases: Only A exists, both A and B exist, and only B exists. In addition, the character "/", unless otherwise specified, usually indicates an "or" relationship between the associated objects. The terms "system" and "network" may be used interchangeably in the embodiments of this application. Unless otherwise specified, in this application, ordinal numbers such as "first" and "second" are intended to distinguish between a plurality of objects, and not intended to limit orders, time sequences, priorities, or importance of the plurality of objects.

Video quality assessment technologies may be classified into a subjective assessment technology and an objective assessment technology.

In the subjective assessment technology, a group of testees are selected to watch different to-be-assessed videos in a controlled environment and subjectively assess the watched to-be-assessed videos, to obtain a correspondence between subjective feelings of the testees and video quality, as shown in Table 1. For example, a subjective feeling for a to-be-assessed video 1 is smooth and clear images without video stalling, indicating that video quality of the to-be-assessed video 1 is excellent. A subjective feeling for a to-be-assessed video 4 is unsmooth and unclear images with obvious video stalling and mosaics, which cannot meet a basic requirement of a video service, indicating that video quality of the to-be-assessed video 4 is poor.

TABLE 1

| To-be-assessed video | Video quality | Subjective feeling |
|---|---|---|
| 1 | Excellent | Smooth and clear images without video stalling |
| 2 | Good | Smooth and relatively clear images with occasional video stalling |
| 3 | Average | Basically smooth and clear images with frequent video stalling, and a mosaic caused by a relatively large motion range |
| 4 | Poor | Unsmooth and unclear images with obvious video stalling and mosaics, which cannot meet a basic requirement of a video service |

As shown in Table 1, assessment results in the subjective assessment technology depend on the testees, and different testees who have watched a same to-be-assessed video may have different subjective feelings. For example, if a testee has a high video quality requirement, a subjective feeling of the testee watching the to-be-assessed video may be smooth and relatively clear images with occasional video stalling. If a testee has a relatively low video quality requirement, a subjective feeling of the testee watching the to-be-assessed video may be smooth and clear images without video stalling. It can be learned that it is difficult to obtain a relatively accurate quality assessment result by using the subjective assessment technology to assess the video quality.

On this basis, the objective assessment technology is proposed. In the objective assessment technology, a plurality of objective indicators (such as a packet loss rate, a delay, and a jitter) of a to-be-assessed video are obtained, and based on correspondences between values of all objective indicators and preset thresholds, a correspondence between objective indicators of all to-be-assessed videos and video quality is obtained, as shown in Table 2. For example, for the to-be-assessed video, when a delay is less than or equal to 80 milliseconds (ms), a jitter is less than or equal to 30 ms, and a packet loss rate is less than or equal to 0.1%/s, video quality is excellent. For the to-be-assessed video, when a delay is less than or equal to 100 ms, a jitter is less than or equal to 30 ms, and a packet loss rate is less than or equal to 3%/s, video quality is average.

TABLE 2

| Quality | Delay (ms) | Jitter (ms) | Packet loss rate (per second) |
|---|---|---|---|
| Excellent | ≤80 | ≤30 | ≤0.1% |
| Good | ≤100 | ≤30 | ≤1% |
| Average | ≤100 | ≤30 | ≤3% |
| Poor | ≤100 | ≤50 | ≤5% |

In the quality assessment result obtained by using the objective assessment technology, an effect, brought by an application playing a to-be-assessed video, on quality of the to-be-assessed video is not considered. For example, when a network parameter remains the same, a same to-be-assessed video may present different quality due to different performance, such as de-jitter and packet loss concealment, of different applications. For example, a packet loss rate 3% is generated in a process of transmitting the to-be-assessed video in a network. However, an application A is unaffected by the packet loss rate, that is, when the to-be-assessed video is played in the application A, image quality of the to-be-assessed video is very clear, and video stalling does not occur. In comparison, an application B may be affected greatly by the packet loss rate, that is, when the to-be-assessed video is played in the application B, image quality of the to-be-assessed video is unclear, and video stalling occurs frequently. It can be learned that the objective assessment technology is not universally applicable to a plurality of different applications.

In view of this, the technical solutions in the embodiments of this application are provided. In the embodiments of this application, an assessment model is first generated based on a subjective assessment result of a user on each sample in a sample set and based on a parameter set (a parameter type in the parameter set may include at least one of a packet loss rate, a delay, and a jitter) of each sample, and then video quality of a to-be-assessed video is assessed by using the assessment model. The subjective assessment results used to generate the assessment model may reflect different quality presented by a same sample in different applications. To be specific, when the assessment model is being generated, objective indicators of all samples and effects, brought by different applications, on video quality of each sample are considered, so that a method for assessing the video quality of the to-be-assessed video by using the assessment model is applicable to different applications. In addition, because the method for assessing the video quality of the to-be-assessed video by using the assessment model is applicable to different applications, relatively accurate assessment results can be obtained when the video quality is assessed in different applications, and accuracy of a video quality assessment method can be improved.

The technical solutions provided in the embodiments of this application may be applied to a scenario in which video quality is assessed. FIG. 1 shows an example of a scenario in which video quality is assessed according to an embodiment of this application. As shown in FIG. 1, first, a video source provides a source video, then an encoder of a server encodes the source video to generate a video data stream that is suitable for playing on a terminal, and then the encoded video data stream is sent to the terminal through a network. A user watches a video on the terminal. In this process, to ensure that video quality of the video data stream that is output by the server can meet a requirement of the user, video quality of the source video needs to be assessed, so as to determine a to-be-used encoding parameter based on an assessment result. For example, the encoding parameter is a compression standard. When video quality of a video data stream obtained by using the H.261 compression standard to compress and encode the source video does not meet the requirement of the user, the H.263 compression standard with better performance may be used to compress and encode the source video, to improve video quality of an encoded video data stream.

As shown in FIG. 1, in the scenario in which video quality is assessed, although the video source, the server, and the terminal are shown, a scenario in actual application includes but is not limited to the video source, the server, and the terminal. For example, the scenario may further include a core network device, a device for carrying a virtual network function, or the like. These are obvious to a person of ordinary skill in the art, and are not described in detail herein. In addition, a quantity of terminals in FIG. 1 is merely an example. In actual application, a server may provide video services for a plurality of terminals.

The following describes the technical solutions provided in the embodiments of this application with reference to the accompanying drawings.

Figure 2:
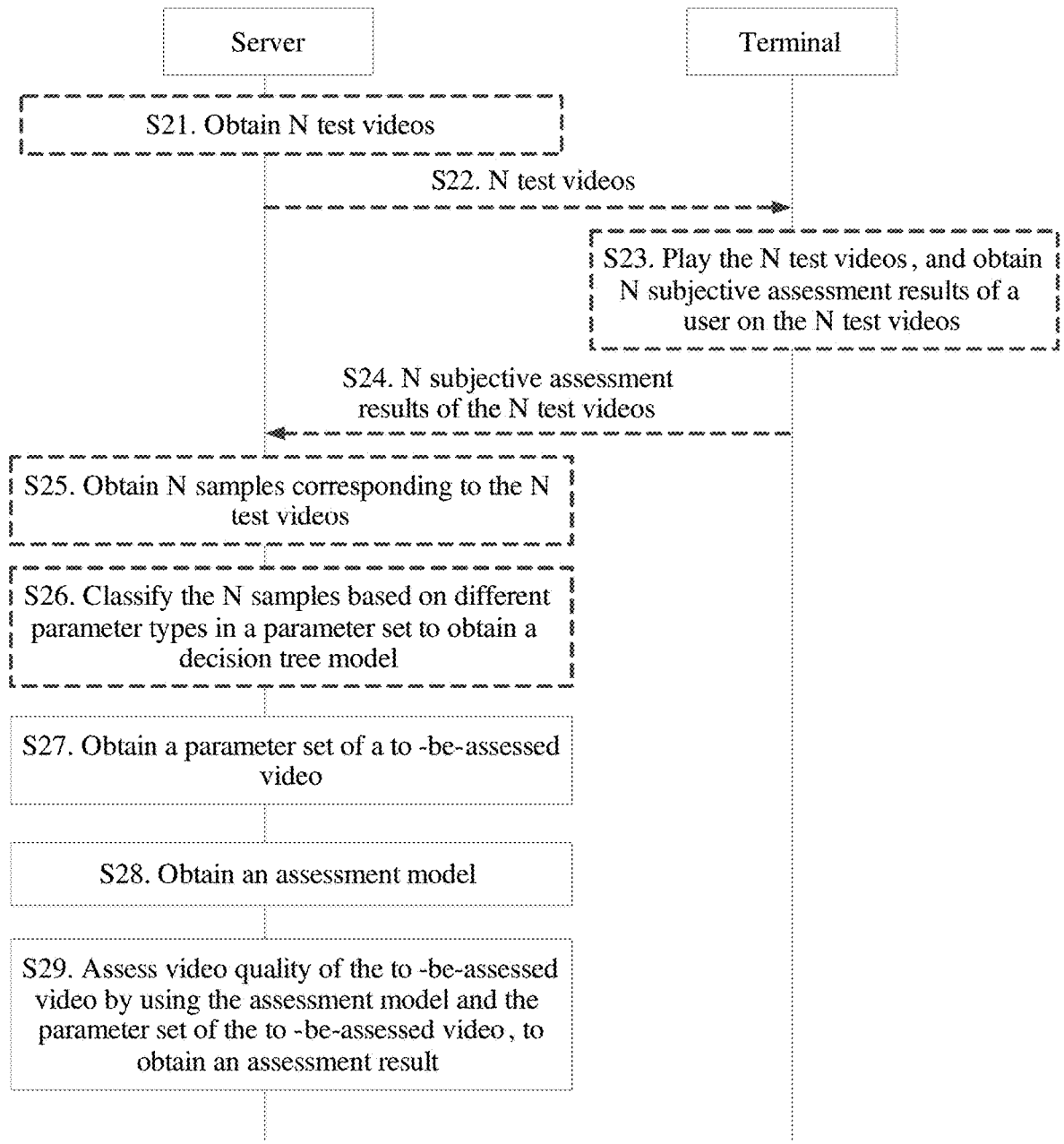
FIG. 2 is a schematic flowchart of a video quality assessment method according to an embodiment of this application.

An embodiment of this application provides a video quality assessment method. FIG. 2 is a schematic flowchart of the method.

In the following descriptions, the method being applied to the scenario shown in FIG. 1 is used as an example. To be specific, in the following descriptions, the server in the scenario shown in FIG. 1 assesses video quality, in other words, the server is used as a video quality assessment apparatus. In addition, the assessment apparatus may be alternatively a communications apparatus that can support the server in implementing a function in the method, or certainly may be another communications apparatus, for example, a chip system. An implementation of the assessment apparatus is not limited herein. For ease of description, the following is described by using an example in which the method is performed by the server.

S21. The server obtains N test videos, where N is an integer greater than or equal to 2.

In this embodiment of this application, the N test videos may be pre-stored in a video source, and then the video source sends the N test videos to the server; or the N test videos may be obtained by processing one or more source videos sent by the video source. The processing manner may be adding an impairment corresponding to each parameter type to the source video. The impairment may be represented by a parameter value of each parameter type. The parameter type includes at least one of a jitter, a delay, a packet loss rate, an encoding type, a throughput, an out-of-order quantity, and the like, or certainly, may include another parameter type. A person skilled in the art may set the parameter type according to actual use requirements, and this is not limited herein.

For example, adding the impairment corresponding to each parameter type to the source video may include but is not limited to the following manner.

Figure 3:
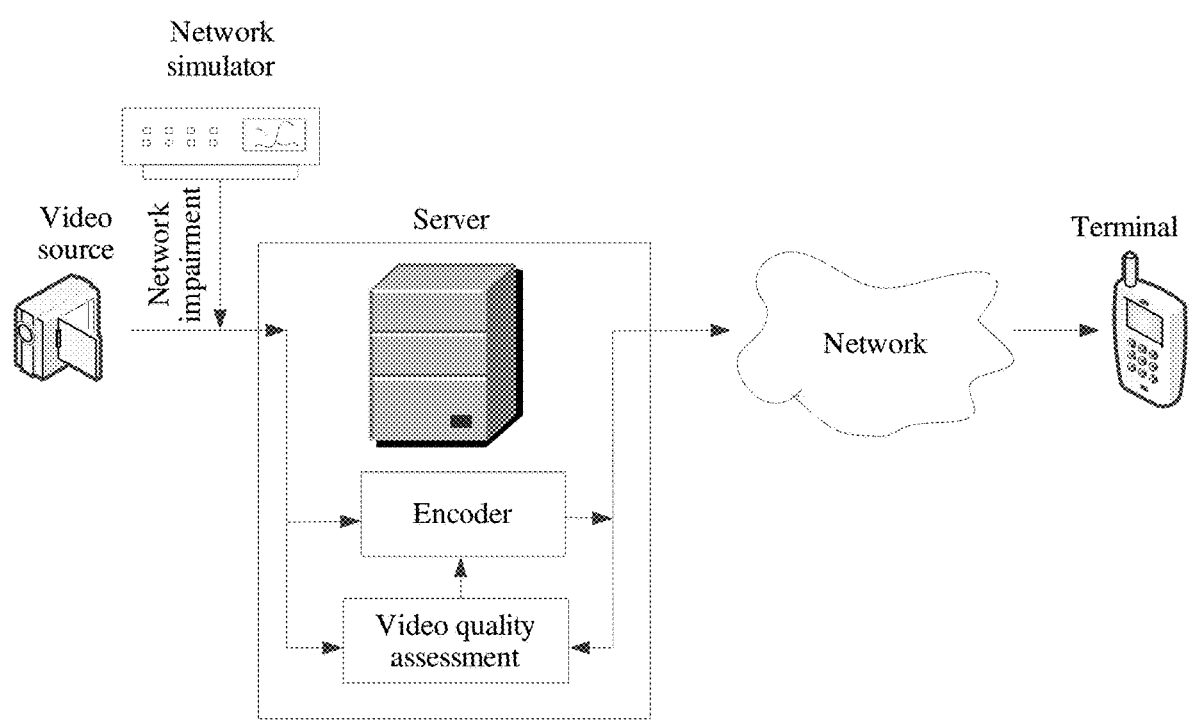
FIG. 3 is a schematic diagram of an example of adding an impairment corresponding to each parameter type to a source video according to an embodiment of this application.

Referring to FIG. 3, a network simulator may be added in series between a video source and a server. After the video source sends a source video to the server, network impairments of the source video are set by using the network simulator, that is, parameter values of various parameter types of the source video are changed, so as to obtain test videos with different network impairments. For example, the video source sends a video data stream of the source video to the server in a form of a data packet, to be specific, the video source splits the video data stream corresponding to the source video into a plurality of data packets, and then sends the plurality of data packets to the server one by one. After detecting the source video sent by the video source, the network stimulator may change content in some data packets of the video data stream. For example, the network stimulator sets one or more data packets in the video data stream as data packets with wrong source addresses. In this way, after detecting the data packets with wrong source addresses, the server directly discards the data packets, thereby increasing a packet loss rate of the source video. Therefore, after receiving all the data packets of the video data stream, the server obtains a test video with a packet loss rate higher than that of the source video. Alternatively, after detecting the video data stream sent by the video source, the network simulator may change a sequence of some data packets in the video data stream, increasing an out-of-order quantity of the video data stream. Therefore, after receiving all the data packets of the video data stream, the server obtains a test video with an out-of-order quantity greater than that of the source video. A process of setting impairments of other parameter types of the source video by using the network simulator is similar to the foregoing process, and details are not described herein again.

S22. The server sends the N test videos to a terminal, and the terminal receives the N test videos.

After obtaining the N test videos, the server sends the N test videos to the terminal.

S23. The terminal plays the N test videos to obtain N subjective assessment results of a user on the N test videos.

After obtaining the N test videos, the terminal plays the N test videos. It should be noted that the terminal may play the N test videos by using a same application, or may play the N test videos by using different applications. This is not limited in this embodiment of this application. When the terminal finishes playing a test video, the terminal may display an assessment interface on which subjective assessment results of different levels may be displayed. For example, the subjective assessment results may be classified into four levels: excellent, good, average, and poor, as shown in Table 1. Alternatively, the subjective assessment results may be classified into five levels: S, A, B, C, and D. As shown in Table 3, if a test video has smooth and clear images without video stalling, a subjective assessment result of the test video is S. If images of a test video cannot be played normally, a subjective assessment result of the test video is D.

TABLE 3

| Video quality | Subjective feeling |
|---|---|
| S | Smooth and clear images without video stalling |
| A | Relatively smooth and clear images with occasional video stalling |
| B | Basically smooth and clear images with frequent video stalling, and a mosaic caused by a relatively large motion range |
| C | Unsmooth and unclear images with obvious video stalling and mosaics |
| D | Images cannot be played normally |

The user may assess the video quality of the test video by performing an input operation on the assessment interface, for example, selecting a subjective assessment result. The terminal determines, based on the input operation, the subjective assessment result corresponding to the test video.

S24. The terminal sends the N subjective assessment results of the user on the N test videos to the server, and the server receives the N subjective assessment results.

After obtaining the N subjective assessment results of the N test videos, the terminal may send the N subjective assessment results to the server together. Alternatively, the terminal may separately send a subjective assessment result corresponding to each test video, that is, after obtaining a subjective assessment result of a test video, the terminal sends the subjective assessment result of the test video to the server. In this embodiment of this application, a manner of sending the N subjective assessment results by the terminal is not limited.

S25. The server obtains a sample corresponding to each of the N test videos, to obtain N samples.

After obtaining the N subjective assessment results of the N test videos, the server obtains the N samples based on the N test videos and the N subjective assessment results.

In this embodiment of this application, each sample in the N samples includes a parameter set of a test video corresponding to the sample and a subjective assessment result of the user on the test video. Parameter types in a parameter set of each test video are the same as parameter types used for setting impairments for the test video. For example, in S21, impairments of jitters, delays, packet loss rates, encoding types, throughputs, and out-of-order quantities of the N test videos are set by using the network stimulator, parameter types in a parameter set of a sample corresponding to the test video include the jitter, the delay, the packet loss rate, the encoding type, the throughput, and the out-of-order quantity. Then, a parameter value of each parameter type of each test video is obtained, so as to obtain a parameter set corresponding to each test video.

The following describes the parameter value of each parameter type.

A delay value of the test video is determined based on a sending time of sending a data packet of the test video by a transmit end and a receiving time of receiving the data packet by a receive end. It should be noted that in the following descriptions, the transmit end is the video source, and the receive end is the server. A test video 1 in the N test videos is used as an example. Assuming that a maximum value of a volume of a data packet that is allowed to be transmitted at a time through a transmission path between the video source and the server is 256 kilobytes (kB), and a volume of the test video 1 is 5 megabytes (MB), the video source splits the test video 1 into 20 data packets, numbers all the data packets from a data packet 0 to a data packet 19, and then sends the 20 data packets to the server one by one according to a sequence of numbers of the data packets. When sending each data packet, the video source may add, to the data packet, a sending moment at which the video source sends the data packet. In this way, after receiving the data packet, the server may determine a delay value of the data packet based on a receiving moment at which the data packet is received and the sending moment carried in the data packet. For example, if a sending moment at which the video source sends the data packet 0 is t1, and a moment at which the server receives the data packet 0 is t2, the server determines that a delay value of the data packet 0 is equal to t2−t1. By analogy, delay values of all data packets of the test video 1, namely, 20 delay values in total, are obtained. Then an average value of the 20 delay values, namely, a delay value of the test video 1, is obtained. Calculation is performed on other test videos in the N test videos in a same manner to obtain a delay value of each test video. As shown in a column 2 in Table 4, delay values of the test video 1 and a test video 2 are 30 ms, a delay value of a test video 3 is 40 ms.

A packet loss rate value of the test video is determined based on a first quantity of data packets of the test video that are sent by the transmit end in a unit time and a second quantity of data packets of the test video that are received by the receive end in the unit time, and the packet loss rate value of the test video is a ratio of the second quantity to the first quantity. For example, the video source splits a test video 1 into 20 data packets and sends the 20 data packets to the server. When sending each data packet, the video source may add a number of the data packet to the data packet. In this way, after receiving the data packet, the server may determine, based on the number of the received data packet, a total quantity of data packets sent by the video source. For example, if a number of the last data packet received by the server in a unit time (the unit time may be a preset time, for example, 10 seconds (s) or 30 s) is 10, the server determines that the video source sends 11 data packets in total in the unit time. Then the server may determine a quantity of received data packets, for example, 9 data packets, and the server determines that a packet loss rate value of the test video 1 is 9/11. Certainly, the server may alternatively calculate a plurality of packet loss rate values of the test video 1 in a plurality of unit times, and then use an average value of the plurality of packet loss rate values as the packet loss rate value of the test video 1. Calculation is performed on other test videos in the N test videos in a same manner to obtain a packet loss rate value of each test video. As shown in a column 3 in Table 4, the packet loss rate value of the test video 1 is 0.5%, a packet loss rate value of a test video 2 is 1%, and a packet loss rate value of a test video 3 is 2%.

A jitter value of the test video is determined based on a time interval between a sending time of each of a plurality of data packets of the test video that are received in a unit time and a receiving time of each data packet received by the receive end in the unit time. For example, the video source splits a test video 1 into 20 data packets and sends the 20 data packets to the server. When sending each data packet, the video source may add, to the data packet, a sending moment at which the video source sends the data packet. In this way, after receiving the data packet, the server may determine a delay value of the data packet based on a receiving moment at which the data packet is received and the sending moment carried in the data packet. For example, if a sending moment at which the video source sends a data packet 0 is t1, and a moment at which the server receives the data packet 0 is t2, the server determines that a delay value $D_0$ of the data packet 0 is equal to t2−t1. By analogy, delay values of a plurality of data packets of the test video 1 that are received by the server in a unit time (the unit time may be a preset time, for example, 10 s or 30 s) are obtained. For example, a quantity of data packets of the test video 1 that are received by the server in a unit time is 9, and delay values of the nine data packets are denoted as $D_0$ to $D_8$. Therefore, the server determines a jitter value of the test video 1 based on a formula (1), and the formula (1) is as follows:

$$D=(|D_2-D_1|+|D_3-D_2|+ \ldots +|D_j-D_{j-1}|)/j-2 \quad (1)$$

where j is a quantity of data packets of the test video 1 that are received by the server in a unit time.

Certainly, the server may alternatively calculate a plurality of jitter values of the test video 1 in a plurality of unit times, and then use an average value of the plurality of jitter values as the jitter value of the test video 1. Calculation is performed on other test videos in the N test videos in a same manner to obtain a jitter value of each test video. As shown in a column 4 in Table 4, the jitter value of the test video 1 is 10 ms, and jitter values of a test video 2 and a test video 3 are 20 ms and 30 ms respectively.

An encoding type value of the test video is a value of an encoding type field carried in a data packet of the test video. For any test video, each data packet of the test video carries an encoding type field. After obtaining a data packet of a test video, the server directly reads an encoding type field in the data packet to obtain an encoding type value of the test video. In this embodiment of this application, there are five encoding types: H.261, MPEG1, MPEG2, H.263, and MPEG4. Therefore, an encoding type is indicated by three bits in an encoding type field. When a value of the encoding type field is 001, it indicates that an encoding type of the data packet is H.261; when a value of the encoding type field is 010, it indicates that an encoding type of the data packet is MPEG1, and so on. Details are not described herein again. As shown in a column 5 in Table 4, encoding type values of test videos 1 4 are 1, and an encoding type value of a test video 5 is 2.

A throughput value of the test video is a value of a quantity of bytes of the test video that are received by the server in a unit time. Assuming that a maximum value of a volume of a data packet that is allowed to be transmitted at a time through a transmission path between the video source and the server is 256 kB, and a quantity of data packets of a test video 1 that are received by the server in a unit time (the unit time may be 10 s) is 6, the server determines that a throughput value of the test video 1 is 256×6=1536 kB/s=1.5 kbps. Calculation is performed on other test videos in the N test videos in a same manner to obtain a throughput value of each test video. As shown in a column 6 in Table 4, the throughput value of the test video 1 is 1.5 kbps, a throughput value of a test video 2 is 1.4 kbps, and a throughput value of a test video 3 is 1.3 kbps.

An out-of-order quantity value of the test video is a quantity of occurrence times of out-of-order data packets of the test video that are received by the server in a unit time. The occurrence of out-of-order data packets may be understood as follows: The server subtracts a number of a received data packet of the test video from a number of a received adjacent data packet of the test video, and if a difference is not 1, it indicates occurrence of out-of-order data packets. For example, a quantity of data packets of a test video 1 that are received by the server in a unit time (the unit time may be 10 s) is 6, and numbers of the six data packets are 0, 1, 2, 4, 6, and 7. A difference between numbers of data packets received for the third time and the fourth time is not 1, and a difference between numbers of data packets received for the fifth time and the fourth time is not 1. Therefore, the server determines that an out-of-order quantity value of the test video 1 is 2. Certainly, the server may alternatively calculate a plurality of out-of-order quantity values of the test video 1 in a plurality of unit times, and then use an average value of the plurality of out-of-order quantity values as the out-of-order quantity value of the test video 1. Calculation is performed on other test videos in the N test videos in a same manner to obtain an out-of-order quantity value of each test video. As shown in a column 7 in Table 4, the out-of-order quantity value of the test video 1 is 2/s, an out-of-order quantity value of a test video 2 is 5/s, and an out-of-order quantity value of a test video 3 is 6/s.

After obtaining parameter sets of the N test videos, the server establishes mapping relationships between the parameter sets of the N test videos and the N subjective assessment results of the user on the N test videos respectively. To be specific, a first mapping relationship between a parameter set of a test video 1 and a subjective assessment result of the user on the test video 1 is established to obtain a first sample corresponding to the test video 1, and a second mapping relationship between a parameter set of a test video 2 and a subjective assessment result of the user on the test video 2 is established to obtain a second sample corresponding to the test video 2, until an Nth mapping relationship between a parameter set of a test video N and a subjective assessment result of the user on the test video N is obtained, so as to obtain the N samples corresponding to the N test videos. Table 4 is a schematic diagram of the N samples.

TABLE 4

| Sample number | Delay/ ms | Packet loss rate | Jitter/ ms | Encoding type | Throughput/ kbps | Out-of-order quantity/ s | Subjective assessment result |
|---|---|---|---|---|---|---|---|
| 1 | 30 | 0.5% | 10 | 1 | 1.5 | 2 | S |
| 2 | 30 | 1% | 20 | 1 | 1.4 | 5 | S |
| 3 | 40 | 2% | 30 | 1 | 1.3 | 6 | S |
| 4 | 50 | 4% | 35 | 1 | 1.2 | 6 | A |
| 5 | 90 | 5% | 40 | 2 | 1 | 7 | B |
| 6 | 100 | 6% | 50 | 2 | 0.9 | 7 | B |
| 7 | 105 | 10% | 55 | 3 | 0.5 | 8 | C |
| 8 | 110 | 15% | 55 | 3 | 0.4 | 10 | D |
| 9 | 110 | 15% | 60 | 3 | 0.35 | 10 | D |
| 10 | 115 | 18% | 65 | 3 | 0.3 | 11 | D |
| ... | ... | ... | ... | ... | ... | ... | ... |
| N | 100 | 30% | 50 | 5 | 0.4 | 10 | D |

S26. The server classifies the N samples based on different parameter types in the parameter set to obtain a decision tree model.

After obtaining the N samples, the server trains the N samples by using a machine learning algorithm, to generate the decision tree model. The machine learning algorithm may include but is not limited to a support vector machine (SVM) algorithm, a k-nearest neighbor (KNN) algorithm, a decision tree algorithm, a random forest algorithm, and the like.

In this embodiment of this application, obtaining the decision tree model includes but is not limited to the following two manners.

Manner 1:

Step 1: Consider each parameter type in the parameter sets in the N samples as a node, classify the N samples by using each node, and calculate conditional information entropy brought by using each node for classification. Compare the conditional information entropy, brought by using each node for classification, with information entropy of the N samples to determine a node with a largest information gain, and use the node as a root node.

Step 2: Determine a parameter value enabling the root node to obtain the largest information gain, and classify the N samples based on a division condition that a value of the root node is greater than or equal to the parameter value, to obtain two level-1 subsets.

Step 3: For each subset, perform processes of step 1 and step 2 to determine a subnode of each subset, where a largest information gain is obtained by using the subnode to classify samples in the subset; and use the subnode to classify the samples in the subset to obtain two level-2 subsets.

Step 4: Perform determining on each level-2 subset, and automatically end classification when each level-2 subset includes only one type of subjective assessment result, so as to obtain the decision tree model; otherwise, repeat step 1 and step 2 until each level-n subset includes only one type of subjective assessment result, so as to obtain the decision tree model.

In this embodiment of this application, dividing the N samples by using a node may be understood as dividing the N samples based on a division condition that a value of the node is greater than or equal to a preset parameter value, so as to obtain a first subset and a second subset. The information entropy of the N samples may be understood as information entropy obtained based on values of the subjective assessment results of the N samples and an occurrence probability of a value of each type of subjective assessment result in the N samples. The conditional information entropy brought by using each node for classification may be understood as a sum of information entropy of the first subset and information entropy of the second subset. Specifically, after the N samples are divided by using a node, the first subset and the second subset are obtained. The first subset includes S samples, the second subset includes Q samples, and N=S+Q. Then, the information entropy of the first subset is obtained based on values of subjective assessment results of the S samples in the first subset and an occurrence probability of a value of each type of subjective assessment result in the first subset, and the information entropy of the second subset is obtained based on values of subjective assessment results of the Q samples in the second subset and an occurrence probability of a value of each type of subjective assessment result in the second subset. Finally, the sum of the information entropy of the first subset and the information entropy of the second subset is calculated, to obtain the conditional information entropy brought by using the node for classification.

For example, N=10, and the following describes the manner 1. Table 4 is an example of 10 samples.

1: Calculate information entropy of the 10 samples, where the information entropy is defined as Ent(D), and a calculation process of the information entropy meets a formula (2):

$$Ent(D) = -\sum_{k=1}^{N} p(k) * \log_2(p(k)) \quad (2)$$

where N is a size of a sample space, namely, a total quantity of samples, and p(k) is a proportion of a sample whose value of a subjective assessment result is k in the sample space.

For the 10 samples shown in Table 4, there are five values of subjective assessment results: S, A, B, C, and D. Subjective assessment results of a sample 1 to a sample 3 are S, a subjective assessment result of a sample 4 is A, subjective assessment results of a sample 5 and a sample 6 are B, a subjective assessment result of a sample 7 is C, and subjective assessment results of a sample 8 to a sample 10 are D. Therefore, p(S)=3/10=0.3, p(A)=1/10=0.1, p(B)=2/10=0.2, p(C)=1/10=0.1, and p(D)=3/10=0.3. The information entropy of the 10 samples is obtained through calculation based on the formula (2):

$$Ent(D) = -(0.3*\log_2 0.3 + 0.1*\log_2 0.1 + 0.2*\log_2 0.2 + 0.1+*\log_2 0.1 + 0.3*\log_2 0.3) = 2.17$$

2: Calculate an information gain corresponding to each node.

Using the jitter as an example, a maximum (max) jitter value and a minimum (min) jitter value in the 10 samples may be obtained. In the 10 samples, the maximum jitter value is 65, and the minimum jitter value is 10. Then enumeration is performed between the maximum value and the minimum value. For example, an enumeration step value may be set to (max−min)/sample quantity and rounded down, that is, (65-10)/10=5.5, and after rounding down is performed, an enumeration step value 5 is obtained. Therefore, conditional information entropy corresponding to jitter parameter values 10, 15, 20, 25, 30, 35, 40, 45, 50, 55, 60, and 65 needs to be calculated. To be specific, conditional information entropy needs to be calculated after the 10 samples are divided based on a division condition that the jitter parameter value is greater than or equal to 10; conditional information entropy needs to be calculated after the 10 samples are divided based on a division condition that the jitter parameter value is greater than or equal to 15; conditional information entropy needs to be calculated after the 10 samples are divided based on a division condition that the jitter parameter value is greater than or equal to 20; . . . ; and conditional information entropy needs to be calculated after the 10 samples are divided based on a division condition that the jitter parameter value is greater than or equal to 65.

For example, conditional information entropy is calculated based on the division condition that the jitter parameter value is greater than or equal to 40. A calculation process of the conditional information entropy is as follows: A quantity of samples whose jitter parameter values are less than 40 is 4, where subjective assessment results of three of the four samples are S, and a subjective assessment result of one of the four samples is A; and a quantity of samples whose jitter parameter values are greater than or equal to 40 is 6, where subjective assessment results of two of the six samples are B, a subjective assessment result of one of the six samples is C, and subjective assessment results of three of the six samples are D. Therefore, the conditional information entropy obtained based on the division condition that the jitter parameter value is greater than or equal to 40 is as follows:

$$Ent(D1) = 4/10 \times [-(3/4 \times \log_2 3/4 + 1/4 \times \log_2 1/4)] + 6/10 \times [-(2/6 \times \log_2 2/6 + 1/6 \times \log_2 1/6 + 3/6 \times \log_2 3/6)] = 1.218$$

Therefore, an information gain (denoted as G(D, jitter 40)) obtained by dividing the 10 samples based on the division condition that the jitter parameter value is greater than or equal to 40 is as follows:

$$G(D, jitter\ 40) = Ent(D) - Ent(D1) = 2.17 - 1.218 = 0.952$$

By using a similar calculation process, G(D, jitter 10), G(D, jitter 15), . . . , and G(D, jitter 65) are calculated. Then, a maximum value is selected, from G(D, jitter 10), G(D, jitter 15), . . . , and G(D, jitter 65), as a corresponding information gain obtained when the node is a jitter. For example, if G(D, jitter 40) is the maximum value, a corresponding information gain is 0.952 when the node is a jitter.

Then, by using a similar calculation process, corresponding information gains are calculated when the node is a delay, a packet loss rate, an encoding type, a throughput, and an out-of-order quantity, and are denoted as G(D, delay), G(D, packet loss rate), G(D, encoding type), G(D, throughput), and G(D, out-of-order quantity).

3: Select a maximum value as a root node from G(D, jitter), G(D, delay), G(D, packet loss rate), G(D, encoding type), G(D, throughput), and G(D, out-of-order quantity).

A maximum value in the foregoing calculated values is determined. For example, the maximum value is G(D, jitter), and G(D, jitter) is a corresponding information gain when the jitter parameter value is 40, so that it is determined that the root node is a jitter, and a value of the root node is 40.

Figure 4A:
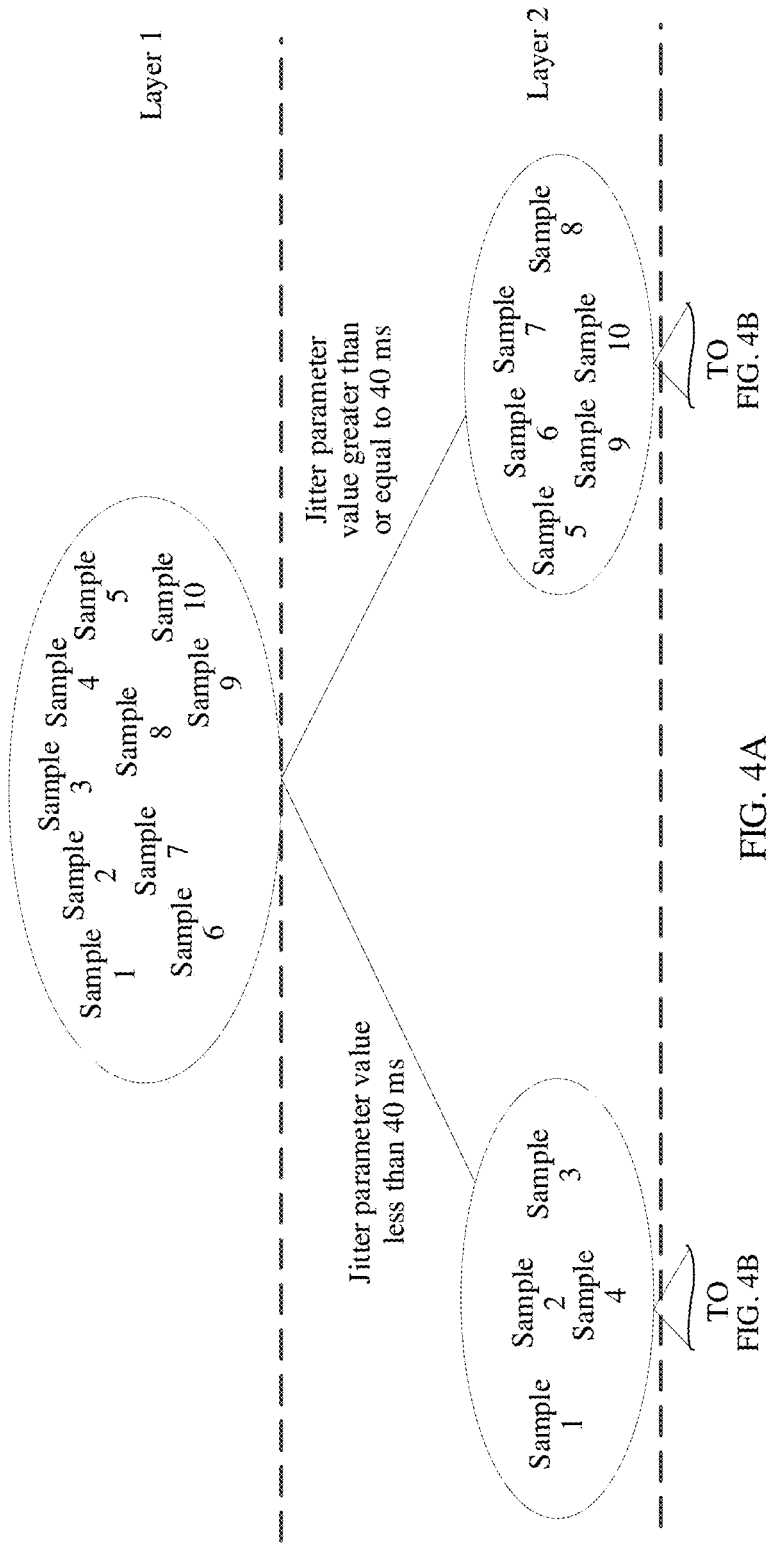
FIG. 4A and FIG. 4B are a schematic diagram of an example of a decision tree model according to an embodiment of this application.
Figure 4B:
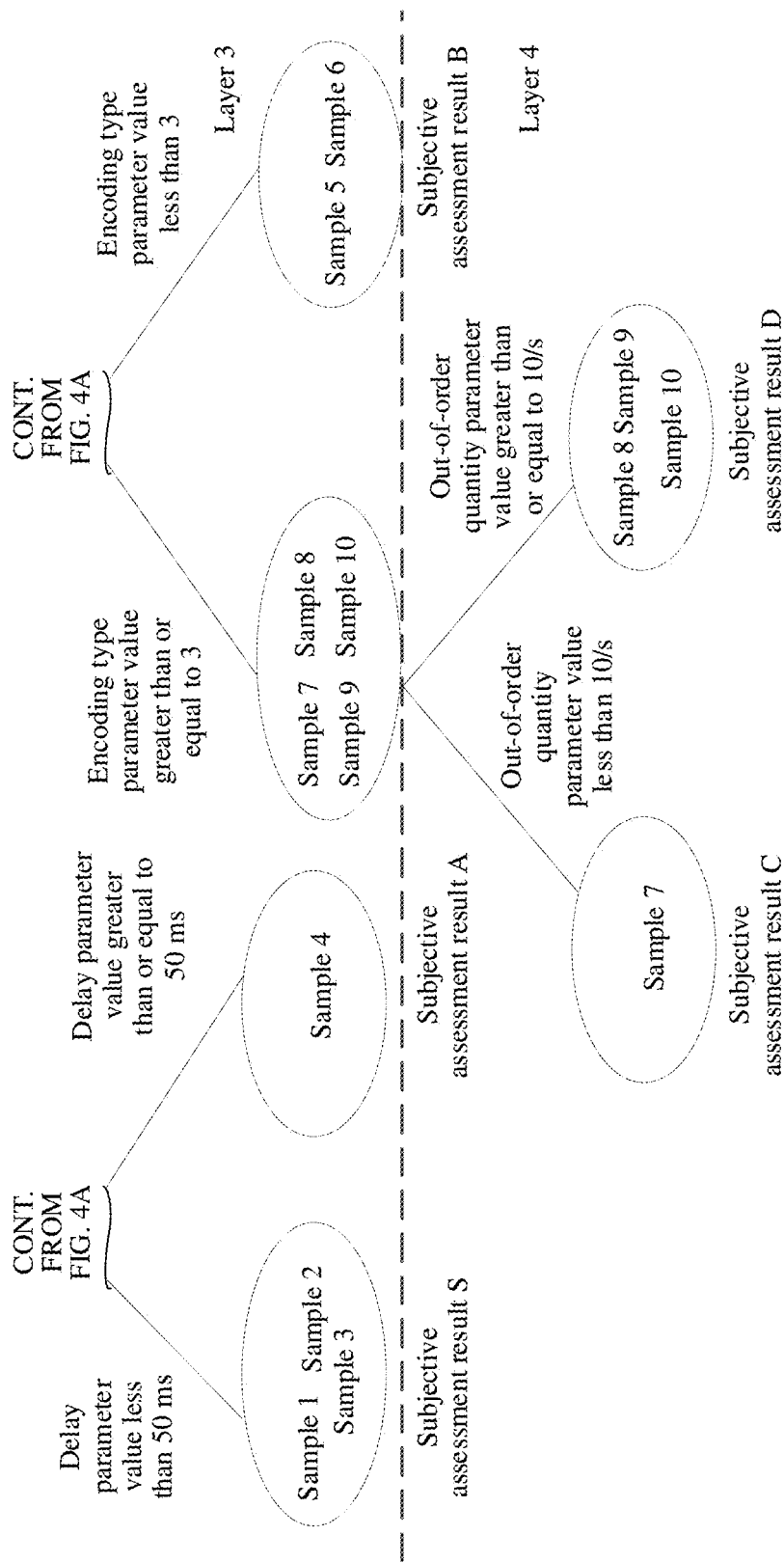

4: Divide the 10 samples into two level-1 subsets based on "being greater than or equal to the value of the root node" and "being less than the value of the root node", to obtain a layer 2 of the decision tree model shown in FIG. 4A. As shown in FIG. 4A and FIG. 4B, based on that the jitter parameter value is greater than or equal to 40 and that the jitter parameter value is less than 40, the 10 samples may be divided into the two level-1 subsets, where a first level-1 subset includes a sample 1 to a sample 4, and a second level-1 subset includes a sample 5 to a sample 10.

5: Then repeat step 2 to step 4 for samples in each level-1 subset to determine a subnode in each level-1 subset, and divide the samples in each level-1 subset based on the subnode. When a level-n subset includes only a value of one type of subjective assessment result, end iteration, so as to obtain the decision tree model shown in FIG. 4A and FIG. 4B.

Manner 2:

To ensure accuracy of the decision tree model, when the decision tree model is being obtained, the N samples may be divided into a plurality of training sets and one test set. For example, three samples are selected from the N samples to form the test set, and then remaining N-3 samples are randomly divided into the plurality of training sets.

Samples in each of the plurality of training sets are classified based on different parameter types in the parameter sets of the N samples, to obtain an initial decision tree model corresponding to each training set. For example, the calculation process includes: calculating an information gain of each parameter type in M samples included in one training set; determining that a first parameter type corresponding to a maximum value of a plurality of calculated information gains is a root node; dividing the M samples in the training set into two level-1 subsets based on a division condition that a value of the root node is greater than or equal to a corresponding parameter value obtained when the root node has a largest information gain; determining a subnode in each level-1 subset by using a same method for determining the root node; and classifying samples in each level-1 subset by using the subnode in the level-1 subset until samples in a level-n subset include only one type of subjective assessment result, to obtain an initial decision tree model corresponding to the training set. It should be noted that a process of obtaining the initial decision tree model corresponding to each training set is similar to a process of obtaining the decision tree model by dividing the N samples in the manner 1. Details are not described herein again.

After the initial decision tree model corresponding to each training set is obtained, a plurality of obtained initial decision tree models are tested by using samples in the test set to obtain a test result corresponding to each initial decision tree model. For example, the test set includes three samples: a sample 1, a sample 4, and a sample 5 shown in Table 4, and the N-3 samples are divided into three training sets, so that the server can obtain three initial decision tree models based on the three training sets. A first initial decision tree model is tested by using the sample 1, the sample 4, and the sample 5, to obtain a first group of test results {S, A, A}; a second initial decision tree model is tested by using the sample 1, the sample 4, and the sample 5, to obtain a second group of test results {S, A, B}, and a third initial decision tree model is tested by using the sample 1, the sample 4, and the sample 5, to obtain a third group of test results {A, A, B}.

A plurality of groups of obtained test results are compared with subjective assessment results of the samples in the test set. If test results in a group of test results are the same as the subjective assessment results of the tested samples, an initial decision tree model corresponding to the group of test results is the decision tree model for video quality assessment. For example, subjective assessment results of the sample 1, the sample 4, and the sample 5 are S, A, and B respectively, and test results obtained by testing the three samples by using the three initial decision tree models are {S, A, A}, {S, A, B}, and {A, A, B}. Therefore, it can be determined that test results of the second initial decision tree model are the same as the subjective assessment results of the three samples, and the second initial decision tree model corresponding to a first training set is the decision tree model for video quality assessment. In the plurality of groups of obtained test results, if at least two groups of test results are the same as the subjective assessment results of the samples in the test set, an initial decision tree model may be randomly selected, from at least two initial decision tree models corresponding to the at least two groups of test results, as the decision tree model for video quality assessment.

It should be noted that S21 to S26 are optional steps, in other words, do not necessarily need to be performed. For example, the decision tree model may be directly written into the server at delivery by a person skilled in the art after the person skilled in the art obtains the decision tree model based on the content in S21 to S26. In this case, S21 to S26 may not be performed.

S27. The server obtains a parameter set of a to-be-assessed video.

When the server needs to assess video quality of the to-be-assessed video, the server obtains the parameter set of the to-be-assessed video. In this embodiment of this application, the parameter set of the to-be-assessed video has a same parameter type as a parameter set of each sample in S26. To be specific, in S26, each sample includes the jitter, the delay, the packet loss rate, the encoding type, the throughput, and the out-of-order quantity, and the server needs to obtain a jitter value, a delay value, a packet loss rate value, an encoding type value, a throughput value, and an out-of-order quantity value of the to-be-assessed video. A specific obtaining manner is similar to that in S25, and details are not described herein again.

For example, Table 5 shows the parameter set of the to-be-assessed video. In Table 5, for the to-be-assessed video, the delay value is 32 ms, the packet loss rate value is 0.6%, the jitter value is 13 ms, the encoding type value is 1, the throughput value is 1.5 kbps, and the out-of-order quantity value is 4.

TABLE 5

| Delay/ms | Packet loss rate | Jitter/ms | Encoding type | Throughput/kbps | Out-of-order quantity/s |
|---|---|---|---|---|---|
| 32 | 0.6% | 13 | 1 | 1.5 | 4 |

S28. The server obtains an assessment model.

In this embodiment of this application, the assessment model is the decision tree model obtained in S26. For example, the assessment model is the decision tree model shown in FIG. 4A and FIG. 4B.

S29. The server assesses the video quality of the to-be-assessed video by using the assessment model and the parameter set of the to-be-assessed video, to obtain an assessment result.

For example, the parameter set of the to-be-assessed video is shown in Table 5, and the assessment model is shown in FIG. 4A. First, the jitter value of the to-be-assessed video is obtained as 13 ms, and the jitter value of the to-be-assessed video is compared with a division condition of a layer 2 in the assessment model. Because 13 ms<40 ms, the delay value 32 ms of the to-be-assessed video is obtained. The delay value of the to-be-assessed video is compared with a division condition of a layer 3 in the assessment model. Because 32 ms<50 ms, an assessment result S of the to-be-assessed video is obtained.

In the foregoing technical solutions, the assessment model for video quality assessment is generated based on a subjective assessment result of the user and a parameter set of a sample. In addition, the subjective assessment result may reflect different quality presented by a same sample in different applications. To be specific, in the assessment model, objective indicators of all samples and effects, brought by different applications, on video quality of each sample are considered, so that the assessment model is applicable to different applications. In this way, a method for assessing the video quality of the to-be-assessed video by using the assessment model is also applicable to different applications.

Further, because the method is universally applicable to different applications, relatively accurate assessment results can be obtained when video quality is assessed in different applications, and accuracy of the video quality assessment method can be improved.

It can be understood that, to implement corresponding functions, the server in the foregoing embodiments may include a corresponding hardware structure and/or a corresponding software module for executing all functions. A person of ordinary skill in the art should easily be aware that, with reference to the embodiments disclosed in this specification, units and algorithm steps may be implemented by hardware or a combination of hardware and computer software. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
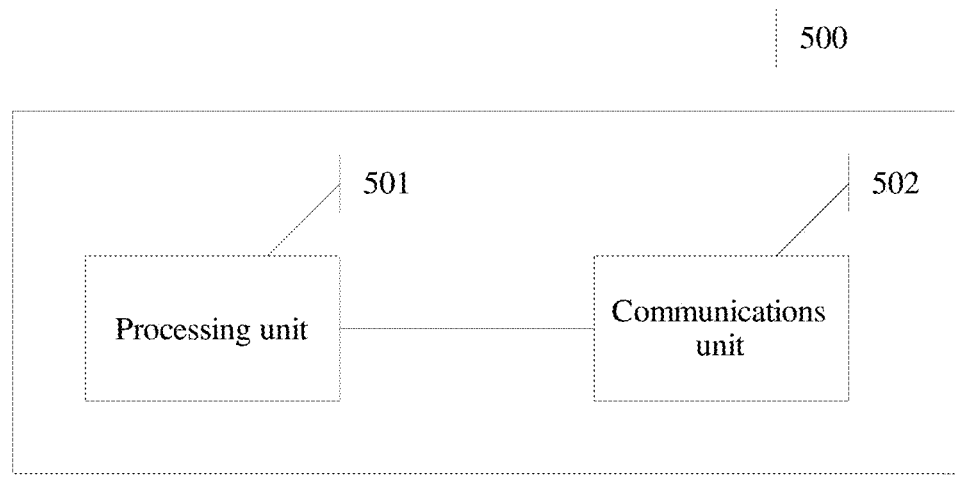
FIG. 5 is a schematic structural diagram of an example of an apparatus according to an embodiment of this application.

FIG. 5 is a schematic structural diagram of an apparatus 500. The apparatus 500 may be a server, and can implement the functions of the server in the method provided in the embodiments of this application. Alternatively, the apparatus 500 may be an apparatus that can support the server in implementing the functions of the server in the method provided in the embodiments of this application. The apparatus 500 may be a hardware structure, a software module, or a hardware structure plus a software module. The apparatus 500 may be implemented by a chip system. In this embodiment of this application, the chip system may include a chip, or may include a chip and another discrete component.

The apparatus 500 may include a processing unit 501 and a communications unit 502.

The processing unit 501 may be configured to perform step S21 and step S25 to step S29 in the embodiment shown in FIG. 2, and/or may be configured to support another process of the technologies described in this specification. The apparatus 500 uses the communications unit 502 to communicate with another module. The communications unit 502 may be a circuit, a component, an interface, a bus, a software module, a transceiver, or any other apparatus that can implement communication.

The communications unit 502 may be configured to perform step S22 and step S24 in the embodiment shown in FIG. 2, and/or may be configured to support another process of the technologies described in this specification.

All content related to the steps in the foregoing method embodiments may be cited in function descriptions of corresponding function modules. Details are not described herein again.

Module division in this embodiment of this application is an example, is merely logical function division, and may be other division in actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 6:
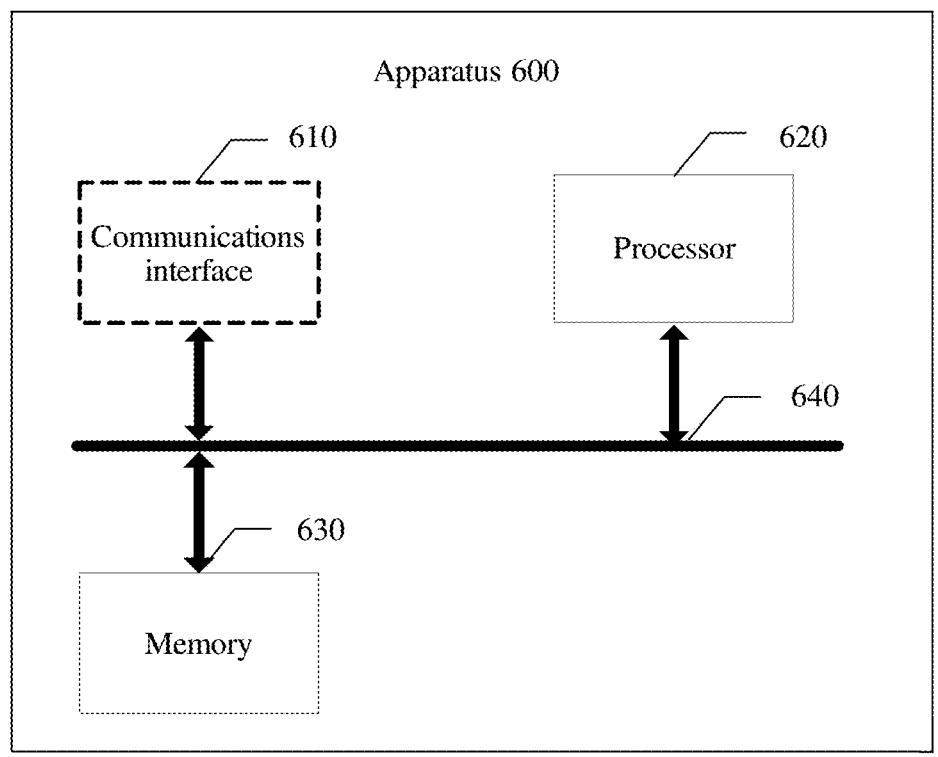
FIG. 6 is a schematic structural diagram of another example of an apparatus according to an embodiment of this application.

FIG. 6 shows an apparatus 600 according to an embodiment of this application. The apparatus 600 may be the server in the embodiment shown in FIG. 2, and can implement the functions of the server in the method provided in the embodiments of this application. Alternatively, the apparatus 600 may be an apparatus that can support the server in implementing the functions of the server in the method provided in the embodiments of this application. The apparatus 600 may be a chip system. In this embodiment of this application, the chip system may include a chip, or may include a chip and another discrete component.

The apparatus 600 includes at least one processor 620 configured to implement or support the apparatus 600 in implementing the functions of the server in the method provided in the embodiments of this application. For example, the processor 620 may obtain a parameter set of a to-be-assessed video, an assessment model for video quality assessment, and the like. For details, refer to the detailed descriptions in the method examples. Details are not described herein again.

The apparatus 600 may further include at least one memory 630 configured to store a program instruction and/or data. The memory 630 is coupled to the processor 620. Couplings in this embodiment of this application are indirect couplings or communications connections between apparatuses, units, or modules, may be implemented in electrical, mechanical, or another form, and are used for information exchange between the apparatuses, the units, or the modules. The processor 620 may cooperate with the memory 630. The processor 620 may execute the program instruction stored in the memory 630. At least one of the at least one memory 630 may be included in the processor.

The apparatus 600 may further include a communications interface 610 configured to communicate with another device through a transmission medium. For example, the another device may be a video source. The processor 620 may send and receive data through the communications interface 610.

In this application, a specific connection medium between the communications interface 610, the processor 620, and the memory 630 is not limited. In this embodiment of this application, the memory 630, the processor 620, and the communications interface 610 are connected through a bus 640 in FIG. 6, and the bus is indicated by a bold line in FIG. 6. The bus may be classified into an address bus, a data bus, a control bus, and the like. For ease of representation, only one bold line is used to indicate the bus 640 in FIG. 6, but this does not mean that there is only one bus or only one type of bus.

In this embodiment of this application, the processor 620 may be a general-purpose processor, a digital signal processor, an application-specific integrated circuit, a field-programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by a combination of hardware in the processor and a software module.

In this embodiment of this application, the memory 630 may be a non-volatile memory such as a hard disk drive (HDD) or a solid-state drive (SSD), or may be a volatile memory such as a random-access memory (RAM). The memory is any other medium that can carry or store expected program code in a form of an instruction or a data structure and that can be accessed by a computer, but is not limited thereto. The memory in this embodiment of this application may be alternatively a circuit or any other apparatus that can implement a storage function, and is configured to store a program instruction and/or data.

An embodiment of this application further provides a computer readable storage medium including an instruction. When the instruction runs on a computer, the computer is enabled to perform the method implemented by the server in the embodiment shown in FIG. 2.

An embodiment of this application further provides a computer program product including an instruction. When the instruction runs on a computer, the computer is enabled to perform the method implemented by the server in the embodiment shown in FIG. 2.

An embodiment of this application provides a chip system. The chip system includes a processor, may further include a memory, and is configured to implement the functions of the server in the foregoing method. The chip system may include a chip, or may include a chip and another discrete component.

A person skilled in the art can make various modifications and variations to this application without departing from the scope of this application. In this way, this application is intended to cover these modifications and variations provided that they fall within the scope of protection defined by the following claims and their equivalent technologies.

What is claimed is:

1. A method comprising:
   obtaining a video parameter set of a video;
   generating an assessment model, wherein the assessment model is based on a subjective assessment result of a user on each sample in a sample set and based on a sample parameter set of each sample, wherein the video parameter set and the sample parameter set have a same parameter type, and wherein the parameter type comprises at least one of a jitter, a delay, or a packet loss rate, wherein the assessment model is generated by:
   classifying N samples into a test set and a plurality of training sets; wherein the N samples correspond to N test videos, N an integer greater than or equal to 2;
   classifying samples in each of the plurality of training sets based on the different parameter types in the parameter set, to generate a plurality of initial decision tree models, wherein the plurality of initial decision tree models comprise an initial decision tree model corresponding to each of the plurality of training sets;
   testing the plurality of initial decision tree models based on at least one sample in the test set to obtain a plurality of groups of test results, wherein the plurality of groups of test results have a one-to-one correspondence with the plurality of initial decision tree models and each group of test results comprise at least one test result that has a one-to-one correspondence with the at least one sample; and
   determining a decision tree model from the plurality of initial decision tree models as the assessment model based on the plurality of groups of test results, wherein the decision tree model is an initial decision tree model corresponding to a first group of test results, and a test result corresponding to each sample in the first group of test results is the same as a subjective assessment result of the sample; and
   assessing a video quality of the video using the assessment model and the video parameter set to obtain an assessment result.

2. The method of claim 1, wherein before obtaining the assessment model, the method further comprises:
   obtaining the N test videos; and
   obtaining a sample corresponding to each of the N test videos to obtain the N samples, wherein the sample comprises the sample parameter set and the subjective assessment result.

3. The method of claim 2, further comprising further obtaining the N test videos by adding an impairment corresponding to each parameter type to a source video, wherein the impairment is represented by a parameter value, and wherein parameter values corresponding to all the parameter types form the sample parameter set.

4. The method of claim 3, further comprising:
   determining a delay value of a first test video of the N test videos based on a sending time and a receiving time of a data packet of the first test video;
   determining a first quantity of data packets of the first test video that are sent in a unit time;
   determining a second quantity of data packets of the first test video that are received in the unit time;
   calculating a packet loss rate value of the first test video as a ratio of the second quantity to the first quantity;
   determining a jitter value of the first test video based on a time interval between a sending time of each of the data packets in the unit time and a receiving time of each of the data packets in the unit time; and
   establishing a mapping relationship between the subjective assessment result and at least one of the delay value, the packet loss rate value, or the jitter value to obtain a first sample corresponding to the first test video.

5. The method of claim 1, further comprising:
calculating an information gain of each parameter type in M samples of the training set;

determining that a first parameter type corresponding to a maximum value of a plurality of calculated information gains is a root node, wherein the M samples make up all samples in the training set, wherein the information gain of each parameter type in the M samples is a difference between first information entropy and second information entropy, wherein the first information entropy is based on a value of a subjective assessment result of each sample in the M samples used as a whole, wherein the second information entropy is a sum of first sub information entropy and second sub information entropy, wherein the first sub information entropy is based on values of subjective assessment results of L samples, wherein the second sub information entropy is based on values of subjective assessment results of P samples, wherein the L samples and the P samples are based on dividing the M samples based on a division condition that a value of the parameter type is greater than or equal to a preset parameter value, wherein M=L+P, and wherein M, L, and P are positive integers;

dividing the M samples into two level-1 subsets based on a division condition that a value of the root node is greater than or equal to a value of the first parameter type, wherein the value of the first parameter type corresponds to a maximum value of information gains of the first parameter type in the M samples;

determining, based on information gains of each parameter type in the two level-1 subsets, that a second parameter type corresponding to a maximum value of a plurality of information gains corresponding to each level-1 subset is a subnode of the level-1 subset;

dividing at least two samples in the level-1 subset into two level-2 subsets based on a division condition that a value of the subnode is greater than or equal to a value of the second parameter type, wherein the value of the second parameter type corresponds to a maximum value of information gains of the second parameter type in the level-1 subset; and obtaining the initial decision tree model when at least two subjective assessment results of at least two samples comprised in any one of the two level-2 subsets are the same or any one of the two level-2 subsets comprises only one sample.

6. The method of claim 1, wherein a server implements the method, and wherein the method further comprises receiving the subjective assessment result from a terminal.

7. An apparatus comprising:
a memory configured to store instructions; and
a processor coupled to the memory and configured to execute the instructions to:
obtain a video parameter set of a video;
generate an assessment model, wherein the assessment model is based on a subjective assessment result of a user on each sample in a sample set and based on a sample parameter set of each sample, wherein the video parameter set has and the sample parameter set have a same parameter type, and wherein the parameter type comprises at least one of a jitter, a delay, or a packet loss rate, wherein the assessment model is generated by:
classifying N samples into a test set and a plurality of training sets; wherein the N samples correspond to N test videos, N is an integer greater than or equal to 2;
classifying samples in each of the plurality of training sets based on the different parameter types in the parameter set, to generate a plurality of initial decision tree models wherein the plurality of initial decision tree models comprise an initial decision tree model corresponding to each of the plurality of training sets;
testing the plurality of initial decision tree models based on at least one sample in the test set to obtain a plurality of groups of test results, wherein the plurality of groups of test results have a one-to-one correspondence with the plurality of initial decision tree models and each group of test results comprise at least one test result that has a one-to-one correspondence with the at least one sample; and
determining a decision tree model from the plurality of initial decision tree models as the assessment model based on the plurality of groups of test results, wherein the decision tree model is an initial decision tree model corresponding to a first group of test results, and a test result corresponding to each sample in the first group of test results is the same as a subjective assessment result of the sample; and
assess a video quality of the video using the assessment model and the video parameter set to obtain an assessment result.

8. The apparatus of claim 7, wherein before obtaining the assessment model, the processor is further configured to:
obtain the N test videos; and
obtain a sample corresponding to each of the N test videos to obtain the N samples, wherein the sample comprises the sample parameter set and the subjective assessment result.

9. The apparatus of claim 8, wherein the processor is further configured to further obtain the N test videos by adding an impairment corresponding to each parameter type to a source video, wherein the impairment is represented by a parameter value, and wherein parameter values corresponding to all the parameter types form the sample parameter set.

10. The apparatus of claim 9, wherein the processor is further configured to:
determine a delay value of a first test video of the N test videos based on a sending time and a receiving time of a data packet of the first test video;
determine a first quantity of data packets of the first test video that are sent in a unit time;
determine a second quantity of data packets of the first test video that are received in the unit time;
calculate a packet loss rate value of the first test video as a ratio of the second quantity to the first quantity;
determine a jitter value of the first test video based on a time interval between a sending time of each of the data packets in the unit time and a receiving time of each of the data packets in the unit time; and
establish a mapping relationship between the subjective assessment result and at least one of the delay value, the packet loss rate value, or the jitter value to obtain a first sample corresponding to the first test video.

11. The apparatus of claim 7, wherein the processor is further configured to:
calculate an information gain of each parameter type in M samples of the training set;
determine that a first parameter type corresponding to a maximum value of a plurality of calculated information gains is a root node, wherein the M samples make up all samples in the training set, wherein the information gain of each parameter type in the M samples is a difference between first information entropy and second information entropy, wherein the first information entropy is based on a value of a subjective assessment result of each sample in the M samples used as a whole, wherein the second information entropy is a sum of first sub information entropy and second sub information entropy, wherein the first sub information entropy is based on values of subjective assessment results of L samples, wherein the second sub information entropy is based on values of subjective assessment results of P samples, wherein the L samples and the P samples are based on dividing the M samples based on a division condition that a value of the parameter type is greater than or equal to a preset parameter value, wherein M=L+P, and wherein M, L, and P are positive integers;

divide the M samples into two level-1 subsets based on a division condition that a value of the root node is greater than or equal to a value of the first parameter type, wherein the value of the first parameter type corresponds to a maximum value of information gains of the first parameter type in the M samples;

determine, based on information gains of each parameter type in the two level-1 subsets, that a second parameter type corresponding to a maximum value of a plurality of information gains corresponding to each level-1 subset is a subnode of the level-1 subset;

divide at least two samples in the level-1 subset into two level-2 subsets based on a division condition that a value of the subnode is greater than or equal to a value of the second parameter type, wherein the value of the second parameter type corresponds to a maximum value of information gains of the second parameter type in the level-1 subset; and obtain the initial decision tree model when at least two subjective assessment results of at least two samples comprised in any one of the two level-2 subsets are the same or any one of the two level-2 subsets comprises only one sample.

12. The apparatus of claim 7, wherein the apparatus is a server, and wherein the apparatus further comprises a receiver configured to receive the subjective assessment result from a terminal.

13. A computer program product comprising computer-executable instructions stored on a non-transitory computer-readable medium that, when executed by a processor, cause an apparatus to:

obtain a video parameter set of a video;

generate an assessment model, wherein the assessment model is based on a subjective assessment result of a user on each sample in a sample set and based on a sample parameter set of each sample, wherein the video parameter set has and the sample parameter set have a same parameter type, and wherein the parameter type comprises at least one of a jitter, a delay, or a packet loss rate, wherein the assessment model is generated by:

classifying N samples into a test set and a plurality of training sets; wherein the N samples correspond to N test videos, N is an integer greater than or equal to 2;

classifying samples in each of the plurality of training sets based on the different parameter types in the parameter set, to generate a plurality of initial decision tree models, wherein the plurality of initial decision tree models comprise an initial decision tree model corresponding to each of the plurality of training sets;

testing the plurality of initial decision tree models based on at least one sample in the test set to obtain a plurality of groups of test results, wherein the plurality of groups of test results have a one-to-one correspondence with the plurality of initial decision tree models, and each group of test results comprise at least one test result that has a one-to-one correspondence with the at least one sample; and determining a decision tree model from the plurality of initial decision tree models as the assessment model based on the plurality of groups of test results wherein the decision tree model is an initial decision tree model corresponding to a first croup of test results, and a test result corresponding to each sample in the first group of test results is the same as a subjective assessment result of the sample; and assess a video quality of the video using the assessment model and the video parameter set to obtain an assessment result.

14. The computer program product of claim 13, wherein before obtaining the assessment model, the instructions further cause the apparatus to:

obtain the N test videos; and obtain a sample corresponding to each of the N test videos to obtain the N samples, wherein the sample comprises the sample parameter set and the subjective assessment result.

15. The computer program product of claim 14, wherein the instructions further cause the apparatus to further obtain the N test videos by adding an impairment corresponding to each parameter type to a source video, wherein the impairment is represented by a parameter value, and wherein parameter values corresponding to all the parameter types form the sample parameter set.

16. The computer program product of claim 15, wherein the instructions further cause the apparatus to:

determine a delay value of a first test video of the N test videos based on a sending time and a receiving time of a data packet of the first test video;

determine a first quantity of data packets of the first test video that are sent in a unit time;

determine a second quantity of data packets of the first test video that are received in the unit time;

calculate a packet loss rate value of the first test video as a ratio of the second quantity to the first quantity;

determine a jitter value of the first test video based on a time interval between a sending time of each of the data packets in the unit time and a receiving time of each of the data packets in the unit time; and establish a mapping relationship between the subjective assessment result and at least one of the delay value, the packet loss rate value, or the jitter value to obtain a first sample corresponding to the first test video.

17. The computer program product of claim 13, wherein the instructions further cause the apparatus to:

calculate an information gain of each parameter type in M samples of the training set; and determine that a first parameter type corresponding to a maximum value of a plurality of calculated information gains is a root node, wherein the M samples make up all samples in the training set, wherein the information gain of each parameter type in the M samples is a difference between first information entropy and second information entropy, wherein the first information entropy is based on a value of a subjective assessment result of each sample in the M samples used as a whole, wherein the second information entropy is a sum of first sub information entropy and second sub information entropy, wherein the first sub information entropy is based on values of subjective assessment results of L samples, wherein the second sub information entropy is based on values of subjective assessment results of P samples, wherein the L samples and the P samples are based on dividing the M samples based on a division condition that a value of the parameter type is greater than or equal to a preset parameter value, wherein M=L+P, and wherein M, L, and P are positive integers.

18. The computer program product of claim 17, wherein the instructions further cause the apparatus to:

divide the M samples into two level-1 subsets based on a division condition that a value of the root node is greater than or equal to a value of the first parameter type, wherein the value of the first parameter type corresponds to a maximum value of information gains of the first parameter type in the M samples; and determine, based on information gains of each parameter type in the two level-1 subsets, that a second parameter type corresponding to a maximum value of a plurality of information gains corresponding to each level-1 subset is a subnode of the level-1 subset.

19. The computer program product of claim 18, wherein the instructions further cause the apparatus to:

divide at least two samples in the level-1 subset into two level-2 subsets based on a division condition that a value of the subnode is greater than or equal to a value of the second parameter type, wherein the value of the second parameter type corresponds to a maximum value of information gains of the second parameter type in the level-1 subset; and obtain the initial decision tree model when at least two subjective assessment results of at least two samples comprised in any one of the two level-2 subsets are the same or any one of the two level-2 subsets comprises only one sample.

20. The computer program product of claim 13, wherein the apparatus is a server, and wherein the instructions further cause the apparatus to receive the subjective assessment result from a terminal.

* * * * *

UNITED STATES PATENT AND TRADEMARK OFFICE
CERTIFICATE OF CORRECTION

PATENT NO.         : 11,070,794 B2                                    Page 1 of 1
APPLICATION NO.    : 16/689742
DATED              : July 20, 2021
INVENTOR(S)        : Hanshu Hong et al.

It is certified that error appears in the above-identified patent and that said Letters Patent is hereby corrected as shown below:

In the Claims

Claim 13, Column 24, Line 11: "corresponding to a first croup of" should read "corresponding to a first group of"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*